W. H. SAMMONS.
REAR INDICATOR FOR VEHICLES.
APPLICATION FILED JUNE 3, 1910.
1,040,771.
Patented Oct. 8, 1912.
2 SHEETS—SHEET 1.
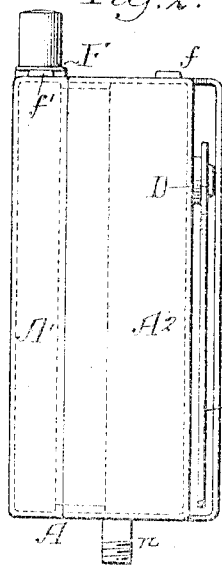
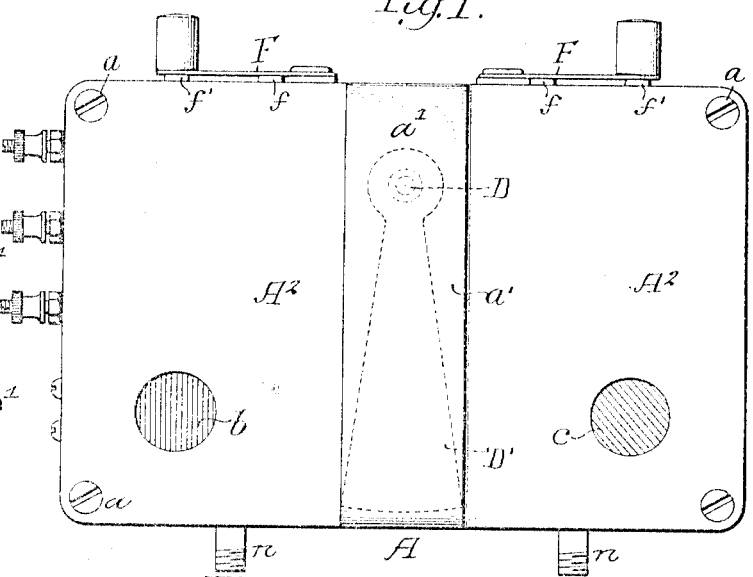
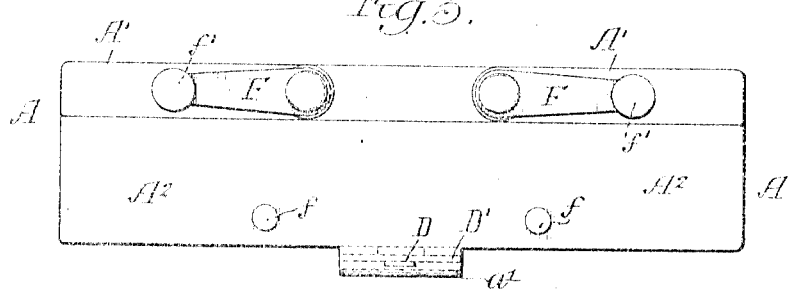
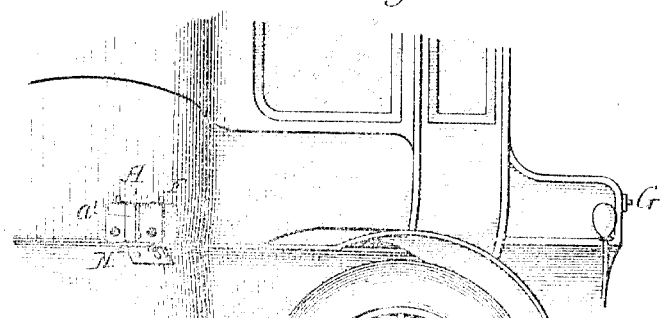
Inventor
Walter H. Sammons.
by his Attorneys,

W. H. SAMMONS.
REAR INDICATOR FOR VEHICLES.
APPLICATION FILED JUNE 3, 1910.

1,040,771.

Patented Oct. 8, 1912.

2 SHEETS—SHEET 2.

Witnesses:
William H. Rivor
Titus H. Irons

Inventor
Walter H. Sammons
by his Attorneys
Howson & Howson

UNITED STATES PATENT OFFICE.

WALTER H. SAMMONS, OF PHILADELPHIA, PENNSYLVANIA.

REAR INDICATOR FOR VEHICLES.

1,040,771.  Specification of Letters Patent.  Patented Oct. 8, 1912.

Application filed June 3, 1910. Serial No. 564,866.

*To all whom it may concern:*

Be it known that I, WALTER H. SAMMONS, a citizen of the United States, residing in Philadelphia, Pennsylvania, have invented certain Improvements in Rear Indicators for Vehicles, of which the following is a specification.

The main object of my invention is to provide an automobile or other vehicle with mechanism which will indicate to an automobile or other vehicle following that to which the device is attached, whether the vehicle will proceed in a straight path or turn to the right or left.

A further object of the invention is to actuate the mechanism through an electric circuit from the chauffeur's or driver's seat of the vehicle.

It is now the practice in many cities, when an automobile is about to turn to the right or left, to indicate the movement by the arm, but this in many instances is impracticable owing to the fact that the chauffeur has to be on the watch at crowded street crossings and it requires all his attention to make the proper turn, whereas by the invention which I shall now proceed to describe warning can be readily given, as the device can be set before coming to the crossing and it will remain set as long as desired.

Figure 4:
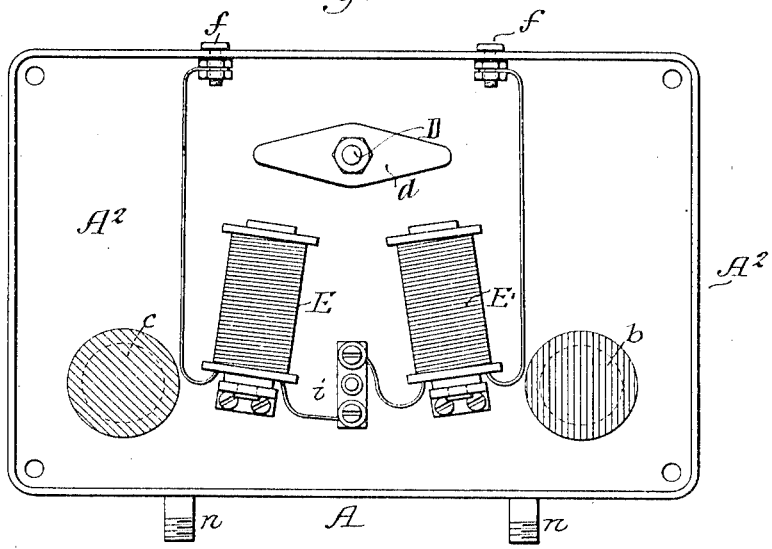
Figure 5:
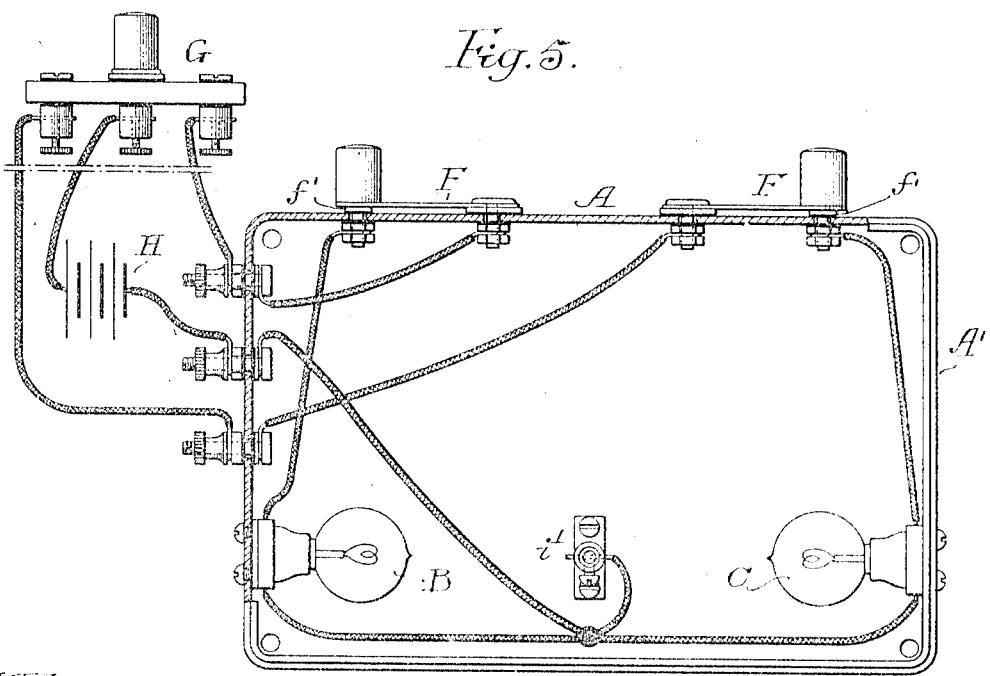

In the accompanying drawings:—Figure 1, is a face view of my improved indicator; Fig. 2, is a side view; Fig. 3, is a plan view; Fig. 4, is a sectional view looking at the front of the case; Fig. 5, is a view looking at the rear of the case and also illustrating the wiring leading from the switch or push buttons at the chauffeur's seat; and Fig. 6, is a view showing the device attached to an automobile.

A is a casing made of metal or other suitable material and preferably made in halves A', A², secured together by screws $a$ or other fastenings. In the front of the casing are two openings $b$ and $c$ through which lights are exposed at night, and one of these openings is glazed with a red glass and the other with a green glass, to indicate left and right. Back of these openings are the electric light bulbs B and C, respectively, Fig. 5.

D is a shaft on which is mounted a semaphore D' which, when in the normal position, is back of a plate $a'$ extending from top to bottom of the casing, so that the semaphore will be out of view when in the central position, and will only be exposed when moved to the right or left. The semaphore is used in daylight to indicate the direction of movement of the vehicle and the electric lights are used at night; the semaphore being cut out by the switches F, F, in the present instance located on the top of the casing, as illustrated in Fig. 1.

Within the casing and carried by the shaft is a two-armed armature $d$, and E, E' are two electromagnets which are so positioned in respect to the armature that when one magnet is energized that arm will be drawn down and the semaphore will be moved into one position, and when the other magnet is energized that arm will be drawn down and the semaphore will be moved into the position opposite, indicating to the vehicle following the direction of movement of the automobile. The magnets E, E' are connected to a switch G located preferably on the arm of the chauffeur's or driver's seat at the front of the vehicle, the circuit passing through the switches F, F and through the battery H. The lights B and C are connected by the wires indicated in Fig. 5, through the switches F, F and battery H to the switch G.

When the switches F, F are in the neutral position, then the device is out of action, and when the switch arms are moved over the contacts $f$, $f$ then the magnets E, E' are in circuit, so that on shifting the switch G to the right or left, the semaphore will be moved to the right or left, indicating the direction of movement of the vehicle. When the switch arms are shifted so that they will be over the contacts $f'$, then the semaphore operating means is out of circuit and the lights are in circuit, so that when the switch at the chauffeur's seat is turned to the right a green light will show, indicating that the machine will turn to the right, and when the switch is turned to the other extreme position the red light will show, indicating that the vehicle will turn to the left. When the switch is in neutral position neither of the lights will show.

When the casing is made in two sections as shown, I mount a plate $i$ on the section A² and a plate $i'$ on the section A', so that when the parts are assembled the two plates will contact one with the other, completing the return circuit, as the plate $i$ is wired to the magnets E, E' while the plate $i'$ is connected to the battery and also wired to the lamps B and C.

I prefer to place the device at the rear of the vehicle and, in the present instance, I mount it on a bracket N and projecting from the bottom of the case are studs $n, n$ which extend through openings in the bracket, and these studs are threaded for the reception of nuts. The device may be placed on the fenders or other parts of the vehicle without departing from the essential features of the invention.

I claim:—

1. A signaling device comprising a casing, having two openings arranged one on either side of a vertical line, an electric lamp back of each opening, a semaphore pivoted between the openings, an armature connected to the semaphore, magnets operable on the armature to rock the semaphore, means in common with the lamps and magnets to throw either the lamps or the magnets into circuit, and means for energizing either lamp when the lamps are in circuit, said latter means also being capable of energizing either magnet when the magnets are in circuit.

2. The combination in a signaling device of a casing having two openings arranged one on each side of a center line, an electric lamp back of each opening, a rock-shaft located between the openings and extending through the casing, a semaphore keyed to the shaft outside the casing, a plate normally covering the semaphore; a two-armed lever keyed to the rock-shaft and forming an armature; two magnets one of said magnets being secured adjacent one arm of said lever the other magnet being secured adjacent the other arm of the lever, one of said magnets when energized being operable on its respective lever arm to rock the shaft in one direction, the other of said magnets when energized being operable on its respective lever arm to rock the shaft in the opposite direction; means in common with the lamps and magnets to throw either the lamps or the magnets into circuit; and means for energizing either lamp when the lamps are in circuit, said latter means also being capable of energizing either magnet when the magnets are in circuit.

3. The combination of a casing having openings, two electric lamps therein, a shaft, a semaphore on the shaft, an armature also on the shaft within the casing, two electromagnets arranged to attract the armature, two switch arms on the casing arranged to throw the lights or the magnets in circuit, and a switch located at the chauffeur's seat and operable to light either lamp when the lamps are in circuit and to energize either magnet when the magnets are in circuit.

In testimony whereof, I have signed my name to this specification, in the presence of two subscribing witnesses.

WALTER H. SAMMONS.

Witnesses:
WILLIAM E. BRADLEY,
WM. A. BARR.